(12) United States Patent
Narayanan et al.

(10) Patent No.: US 7,895,206 B2
(45) Date of Patent: Feb. 22, 2011

(54) SEARCH QUERY CATEGRIZATION INTO VERTICALS

(75) Inventors: Vijay K. Narayanan, Mountain View, CA (US); Jiangyi Pan, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 395 days.

(21) Appl. No.: 12/043,068

(22) Filed: Mar. 5, 2008

(65) Prior Publication Data

US 2009/0228437 A1   Sep. 10, 2009

(51) Int. Cl.
  *G06F 17/30*   (2006.01)
(52) U.S. Cl. .................. 707/737; 707/713; 707/763
(58) Field of Classification Search .............. 707/1–7, 707/10, 100–104.1, 602, 603, 672, 713, 737, 707/740, 768
See application file for complete search history.

(56) References Cited

U.S. PATENT DOCUMENTS 7,603,348 B2 * 10/2009 He et al. ............................ 1/1
7,610,282 B1 * 10/2009 Datar et al. ........................ 1/1
2006/0206306 A1 * 9/2006 Cao et al. ...................... 704/4
2008/0114750 A1 * 5/2008 Saxena et al. .................. 707/5

* cited by examiner

*Primary Examiner*—Cam-Linh Nguyen
(74) *Attorney, Agent, or Firm*—Hickman Palermo Truong & Becker LLP

(57) ABSTRACT

The likelihood that a query belongs to a vertical is determined. The query is assigned to a vertical based on that likelihood. A query submitted to a main search box is assigned to verticals and processed using indices specific to those verticals. The query is assigned to verticals based on coverage adjusted log likelihood per unit (CALL) values for that query in those verticals. An offline learning component computes UNITS dictionaries and learns the distributions of query units in the main search and each of the vertical searches using query logs. An online scoring and ranking component uses the query distributions and UNITS dictionaries to determine the CALL values and a likelihood of the query belonging to any vertical. The search query is then assigned to verticals based on the likelihoods. The search query is then processed by all the verticals the query is assigned to.

16 Claims, 4 Drawing Sheets

SEARCH QUERY CATEGRIZATION INTO VERTICALS

FIELD OF THE INVENTION

The present invention relates to query processing, and more specifically, to statistically matching a query to a specific vertical index.

BACKGROUND

A search query is a powerful, real-time indicator of user's intent and interests. Any system that can characterize a user's interests from the search query is useful for both content recommendation and ad-targeting purposes. A search query submitted within a particular focus area of a site, such as travel, finance, music, etc., otherwise known as a vertical, is a good indicator of the user's interests in that vertical. Users who perform searches within a particular vertical provide valuable context information which aids in generating high quality search results and are good candidates for recommendation and targeting applications within that vertical. However, a vast majority of users submit queries to the main search box and not within any particular vertical. The main search box does not provide context information.

The volume of search queries, over a given period, in main search is typically one to two orders of magnitude larger than the volume of queries within any given vertical. A tool that characterizes a main search query as relevant or belonging to one or more particular verticals allows the main search query to be submitted to recommendation and ad-targeting applications tailored to the particular verticals, which greatly increases the effectiveness of ads and recommendations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
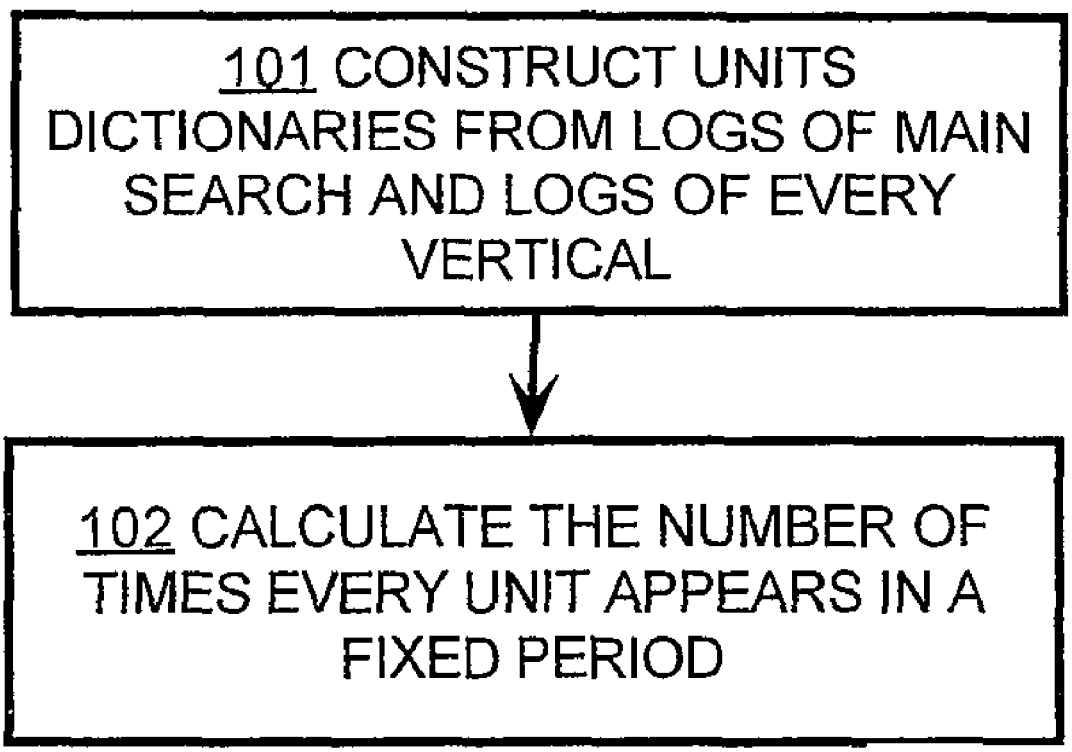
FIG. 1 depicts the offline learning component according to one embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In current approaches, a user implicitly specifies which index a search engine uses to process a search query. For example a user can submit a search query to a main search box or a search toolbar. The search engine will then use the main index to process the query. If a user navigates to a particular vertical, such as travel, sports, or real estate, and then submits a search query, the search engine will process the search query using an index specific to the vertical. The search queries are not shared among indexes.

In an approach described in this application, a search query submitted to the main search box may be assigned to any vertical and subsequently processed using components specific to that vertical.

For example a search query "Cincinnati" submitted to the main search box can be assigned to verticals sports, real estate, or travel, based on the frequency with which the search query appears in the verticals. The frequency with which the query term appears in each vertical is derived from search query logs. For example, 1% of all queries submitted to the travel vertical might be related to Cincinnati. On the other hand, less than 0.1% percent of all queries submitted to the real estate vertical might be related to Cincinnati, and the number of search queries for "Cincinnati" in the sports vertical might also be less than 0.1%. Looking at the percentage of queries submitted to different verticals, the search query most likely belongs to the travel vertical.

The frequency approach does not work as well in situations where there are multiple terms in a search query. For example, a complete search query "Cincinnati Bengals record for past 5 years" might not have ever been encountered before. In such situations, frequency data does not exist for the search query. However, information may be gleaned from individual terms making up the search query. These terms might have appeared in the searches of some verticals. In an approach described in this application, first, the probability of appearance of a set of terms in a vertical, when the vertical is specified, is computed. Then, using the first result, the likelihood of a set of terms belonging to a vertical, when the set of terms are specified, is computed. The computation takes into account that not every query term will have an associated frequency, and in some cases multiple query terms can be treated as a single query term. The likelihood value is called coverage adjusted log likelihood per unit (CALL).

The search query is assigned to verticals based on CALL values. A system used to determine CALL values for a given search query consists of two components: the offline learning component, which computes UNITS dictionaries and learns the distributions of search query units in main search and each of the vertical searches using query logs, and the online scoring and ranking component, which uses the query distributions and UNITS dictionaries computed in the learning component to determine the CALL values and subsequently a likelihood of the search query belonging to any vertical. The search query is then assigned to verticals based on the likelihood. The search query is then processed by all the verticals to which the query is assigned, producing a unified listing of results and ads.

Offline Learning Component

FIG. 1 depicts the offline learning component, according to one embodiment of the invention. In step 101, UNITS dictionaries are constructed for the main search and every vertical search using query logs from the main search as well as query logs from every vertical. The manner of construction of UNITS dictionaries is described in U.S. Pat. No. 7,051,023, entitled "SYSTEMS AND METHODS FOR GENERATING CONCEPT UNITS FROM SEARCH QUERIES," filed on Nov. 12, 2003. U.S. Pat. No. 7,051,023 is incorporated in this application by reference.

In step 102, the offline learning component calculates, for every vertical, and for every unit belonging to that vertical, the number of times that each unit appears over a fixed period in the query logs for that vertical. The appearance frequency data is stored in the UNITS dictionary. The UNITS dictionaries are used to calculate the probability distribution of units for any vertical. The following notation is used: P(U|V), which signifies, given a vertical V, what is the probability of a unit U appearing in the vertical V.

Online Ranking and Scoring Component

Figure 2:
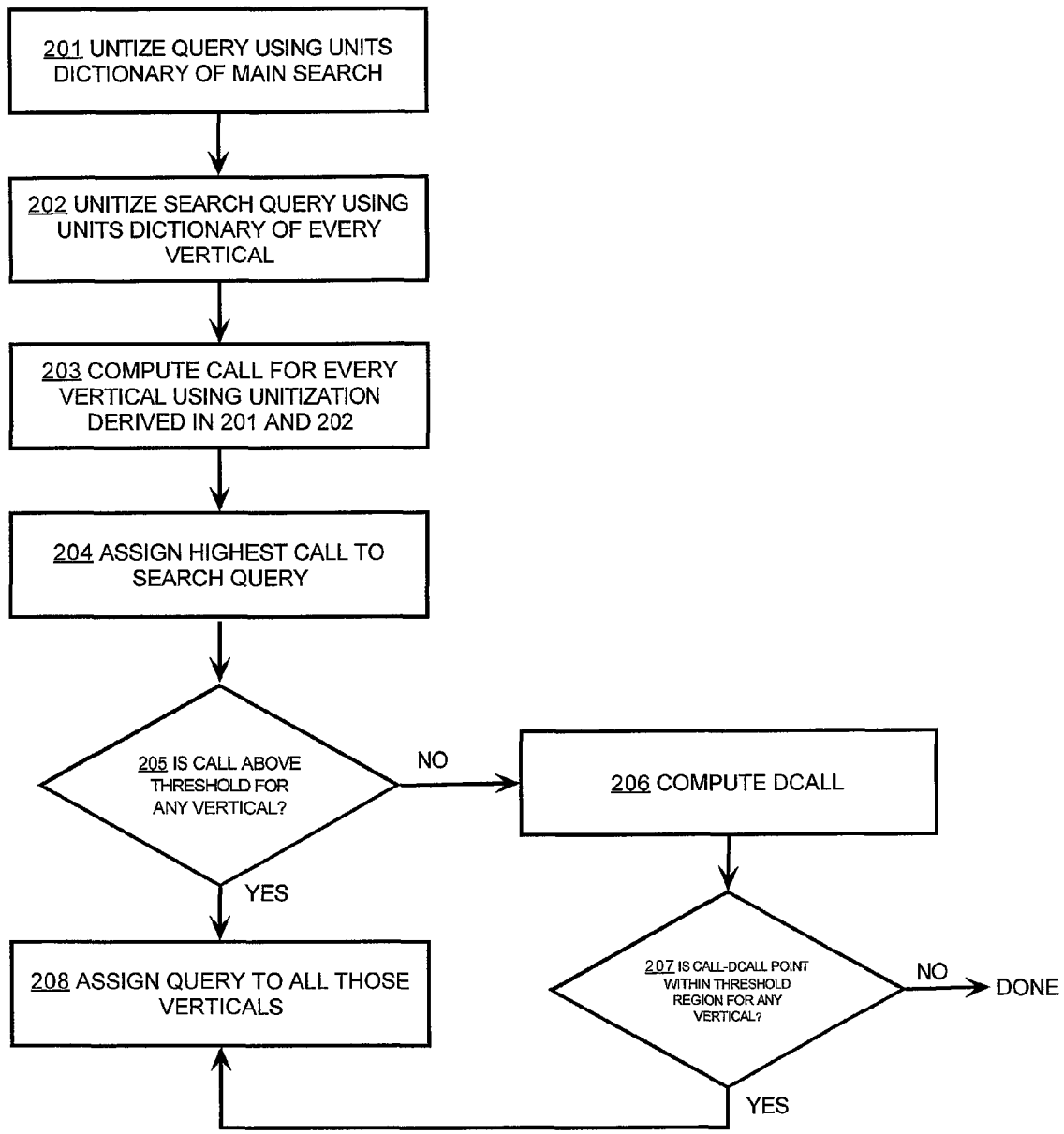
FIG. 2 depicts the online ranking and scoring component according to one embodiment of the invention.

FIG. 2 depicts the online ranking and scoring component, according to one embodiment of the invention. In step 201, a search query submitted to the main search is unitized using the UNITS dictionary of the main search constructed in step 101. In step 202, the search query is unitized using the UNITS dictionaries of every vertical. The UNITS dictionaries can differ between verticals. Therefore, there can be as many distinct unitizations of a particular query as there are verticals. In step 203, the coverage adjusted log likelihood per unit (CALL) of the main search query is computed. CALL is computed for each vertical using (a) the main search unitization derived in step 201 and (b) the vertical unitization derived in step 202. In step 204, the highest of the CALL values computed in step 203 is assigned to the search query. The number of CALL values assigned to the search query is equal to the number of verticals. The assigned values represent relevance likelihood of the main search query to each vertical. In step 205, every CALL value assigned to the search query is compared to a threshold value. If the CALL value of a vertical is above the threshold, then the search query is assigned to the vertical in step 208. The search query can be assigned to multiple verticals. In one embodiment of the invention, there may be a unique threshold value for every vertical. In step 205, if the CALL value is below the threshold, then the difference in coverage adjusted log likelihood (DCALL) is computed in step 206. In step 207, the DCALL and CALL values are used to create a point on a plane. If the point is within the threshold region, then the search query is assigned to the vertical in step 208. Otherwise, the search query is not assigned to that vertical.

Unitizing a Search Query

In order to perform steps 201 and 202, the online ranking and scoring component reads the UNITS dictionaries of the main search and of each vertical (there may be a separate UNITS dictionary for each vertical), constructed in the learning component. The search query is then segmented into units or unitized using the main search UNITS dictionary and the separate UNITS dictionaries of each vertical. Different UNITS dictionaries can unitize the same search query in different ways. The following notation is used: a query Q is unitized into units u1, u2, u3 . . . uN. For example, a query Q="lyrics call me the breeze" is unitized into 4 component units, u1="lyrics", u2="call", u3="me" and u4="the breeze", using the main UNITS dictionary. However, query Q is segmented into only 2 component units, u1="lyrics", and u2="call me the breeze", using the music vertical's UNITS dictionary.

For another example, the query might be Q="Paris Hilton." The query may be unitized into u1="Paris Hilton" using an image vertical UNITS dictionary because the terms "Paris Hilton" appear more frequently together in the image vertical search logs than the terms "Paris" and "Hilton" appear alone in the image vertical search logs. The same query may be unitized into u1="Paris" and u2="Hilton" using a travel vertical UNITS dictionary.

A given unitization might not cover all the words in a query. For example, the query "Tamkang University" might be segmented as u1="Tamkang University" by the main search's UNITS dictionary, but might only be segmented into u1="University" using the music vertical's units dictionary; the name of the university, Tamkang, might be dropped.

The online ranking and scoring component splits a search query into a set of tokens, by using the UNITS system. In alternative embodiments of the invention, different methods for splitting a search query may be used.

Computation of Unitization Coverage

The unitization coverage (UC) of a vertical is the ratio of (a) the number of unitized words using the vertical's UNITS dictionary and (b) the number of unitized words using the main search UNITS dictionary.

$$UC(vertical\_i) = TUV/TUM$$

In the above formula, TUV is the number of unitized words using vertical_i's UNITS dictionary. TUM is the number of unitized words using the main UNITS dictionary. Thus, in the example query "Tamkang University" above, the unitization coverage of the music vertical is 0.5 since TUV equals 1 and TUM equals 2.

Computation of Probability A Query Belongs to A Vertical

For each unitization of a search query, the probability that the query belongs to a vertical_i is calculated using Bayes' theorem as follows:

$$P(vertical\_i | u1, u2, u3 \ldots uN) = P(u1, u2, u3 \ldots uN | vertical\_i) * P(vertical\_i) / P(u1, u2, u3 \ldots uN).$$

Assuming that the units are conditionally independent given a vertical. i.e., $$P(u1, u2, u3 \ldots uN | vertical\_i) = P(u1 | vertical\_i) * P(u2 | vertical\_i) * P(u3 | vertical\_i) \ldots * P(uN | vertical\_i),$$

each of the terms P(u|vertical) is computed using the UNITS dictionaries constructed in the offline learning component. The term P(vertical_i) is the a-priori probability of query in vertical_i, which is the fraction of all search queries that occur in that vertical_i. The denominator P(u1,u2,u3 . . . uN) is the joint units distribution, and is a constant for a given query given its unitization, and will only scale the probability value, but not change the ranking of the probability of verticals.

Computation of Coverage Adjusted Log Likelihood

The relevance of a query Q to each vertical is measured by the query's CALL value. The CALL value of a query is computed as follows:

$$CALL(Q|\text{vertical}\_i) = UC(\text{vertical}\_i) * \{\log[P(\text{vertical}\_i)] + \log[P(u1|\text{vertical})] + \log[P(u2|\text{vertical}\_i)] + \log[P(u3|\text{vertical}\_i)] + \ldots + \log[P(uN|\text{vertical}\_i)]\}/N,$$

where N is the number of units and u1 through uN are the individual units. The log function is a natural logarithm. The division by N serves to normalize the CALL value across verticals so that meaningful comparisons between call values can be drawn. Using the previous example, based on a search query Q="Paris Hilton", when u1="Paris Hilton", then N=1. For another example, for the same query, if u1="Paris" and u2="Hilton", then N=2.

Two CALL values are computed for every vertical. One CALL value is computed using the query unitization based on the main search UNITS dictionary. A second CALL value is computed using the vertical-specific UNITS dictionary. Every vertical_i is assigned the highest of the two computed CALL values for that vertical_i.

Computation of Difference in Coverage Adjusted Log Likelihood

Figure 3:
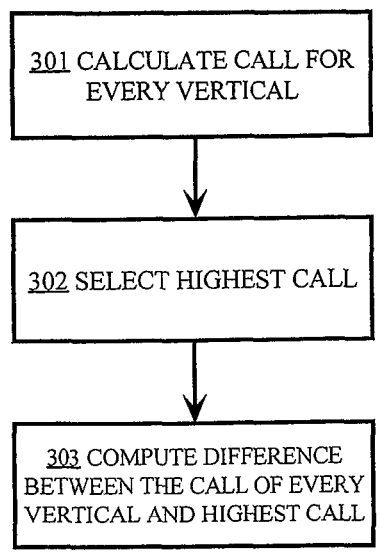
FIG. 3 depicts computation of a DCALL value according to one embodiment of the invention.

Difference in coverage adjusted log likelihood (DCALL) is computed in order to determine which vertical to place the query into. FIG. 3 depicts computation of a DCALL value. In step 301, a CALL value is computed for a query Q with respect to every vertical. In step 302, the highest CALL (which belongs to one of the verticals vertical_h) of all the CALL values computed in step 301 is selected. DCALL is computed in step 303. A DCALL value is the difference between the CALL value of the vertical and the highest CALL value (which belongs to vertical vertical_h).

$$DCALL(Q|\text{vertical}\_i) = CALL(Q|\text{vertical}\_i) - CALL(Q|\text{vertical}\_h),$$

where vertical_h=argmax_i CALL(Q|vertical_i).

Assigning Query to a Vertical Using a DCALL-CALL Plane

Figure 4:
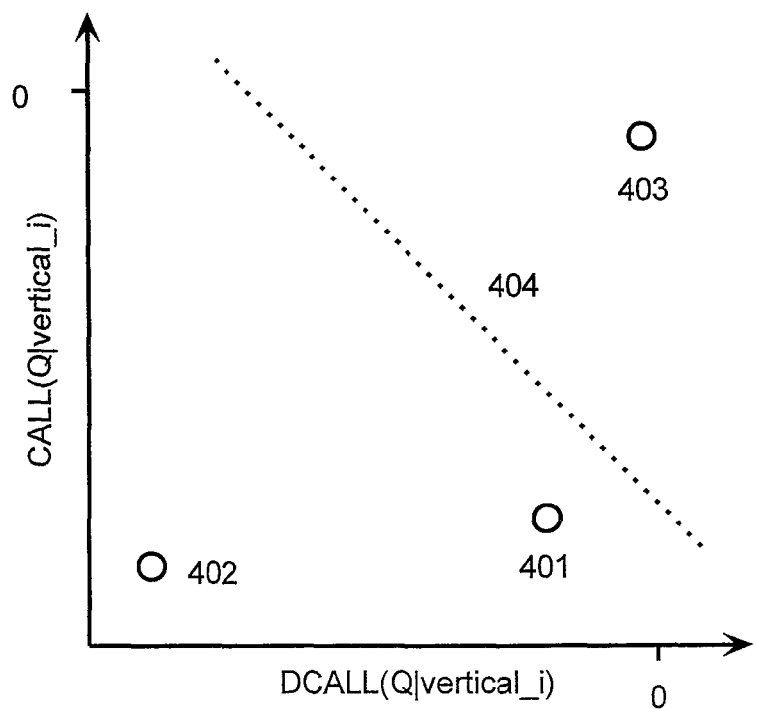
FIG. 4 depicts a DCALL-CALL plane according to one embodiment of the invention.

In situations where a CALL value for a search query does not exceed a threshold in step 205, the search query may be assigned to a vertical based on the relationship of CALL and DCALL values for that vertical. The relationship is shown by a DCALL-CALL plane. FIG. 4 depicts a DCALL-CALL plane, which is used to assign search queries to verticals.

The x axis represents DCALL values. The y axis represents the CALL values. Whenever a CALL-DCALL value pair is computed for a search query, within a vertical, the value pair defines a point on the DCALL-CALL plane. The position of the point determines whether the search query will be assigned to a vertical represented by the DCALL-CALL plane.

For example, point 401 has a low CALL value and a high DCALL value, which indicates that the search query has a low likelihood of appearing in the given vertical represented by the plane, and the search query's CALL value is close to a vertical associated with the highest CALL value. Hence, the query has a low likelihood of appearing in any vertical. Point 402 shows a low CALL value and a low DCALL value, which indicates that the search query has a low likelihood of appearing in the vertical represented by the plane; the search query is more likely to appear in another vertical. Point 403 has both a high CALL value and a high DCALL value, indicating that the search query has a high likelihood of appearing in the given vertical represented by the plane. Point 403 is close to the vertical with the highest CALL value. Such situation may arise between two closely related verticals such as shopping and auctions.

Queries are assigned to verticals by delineating a region on the DCALL-CALL plane as indicated by line 404. The position of the line dictates how likely a search query is to appear in a vertical before the search query is assigned to that vertical. In one embodiment of the invention, every search query having DCALL-CALL values that fall to a region right of line 404 are assigned to the vertical that is represented by the plane. In other embodiments of the invention, a region can be alternatively defined, for example by altering the position, or slope of the line. An arbitrary region may also be selected. In another embodiment, an alternate shape may be selected for the region. Distinct regions may be defined for each vertical.

For example, a shopping vertical search might have an average of one million search queries per day, and a main search box might have one hundred million search queries per day. If 10% of the main search box queries are categorized as being relevant to the shopping vertical using certain thresholds in the DCALL-CALL plane, then there will be a tenfold increase in traffic to any targeting applications within the shopping vertical. The increased traffic to the shopping vertical can be used to increase the inventory for showing content and ads related to shopping thereby increasing both the user experience and the click through rates. The categorization thresholds in the DCALL-CALL plane can be adjusted to either select search queries from the main search box that are more relevant to shopping, or more inventory with weaker relevance to shopping.

Hardware Overview

Figure 5:
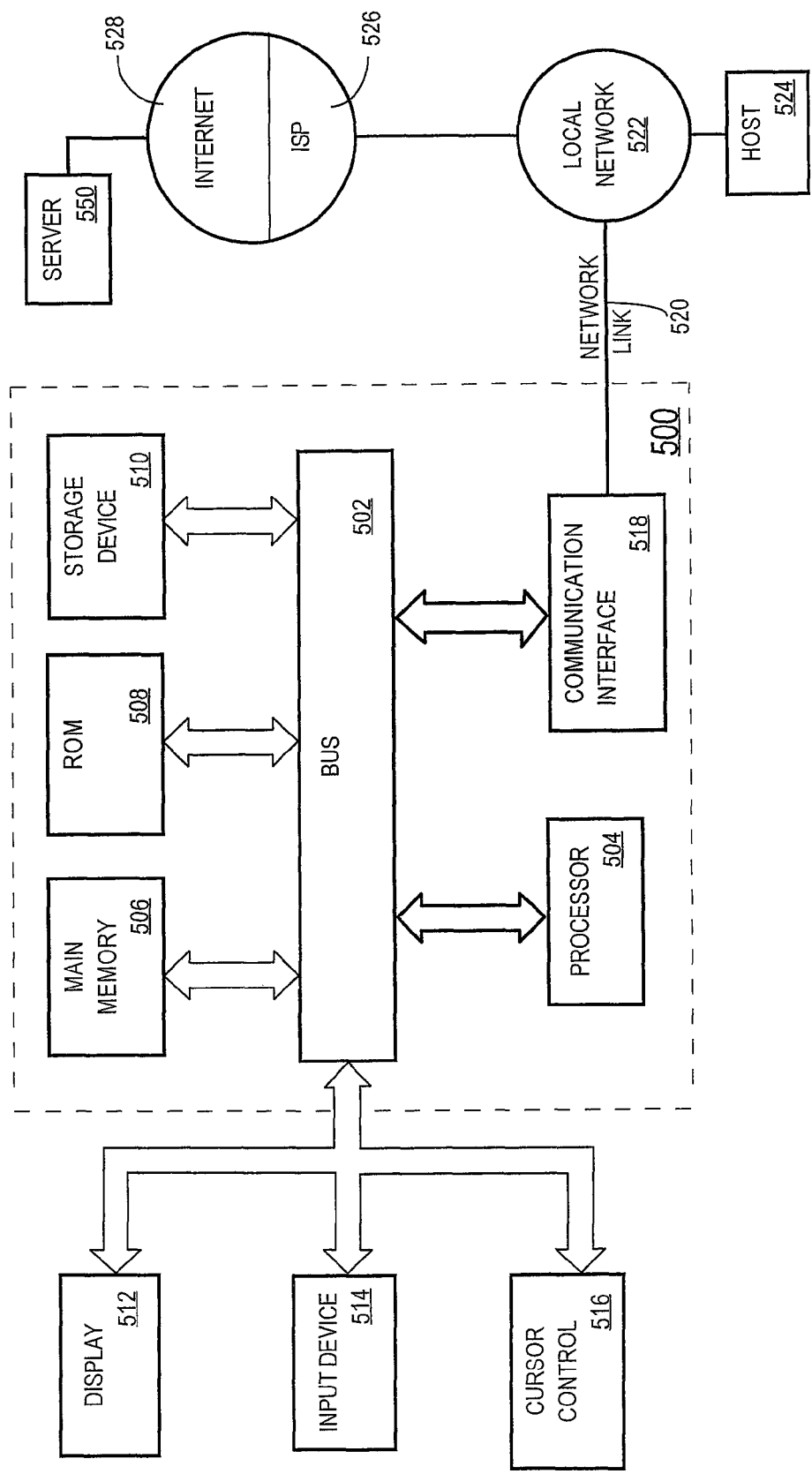
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for assigning a search query to one or more verticals, the method comprising the steps of:

segmenting a search query into one or more units;

wherein each unit of the one or more units is an element of a query;

for each of the one or more verticals, computing a coverage adjusted log likelihood for the search query;

wherein, for each particular vertical of the one or more verticals, the coverage adjusted log likelihood for the particular vertical is a conditional probability of the query appearing in a log of queries previously submitted within the particular vertical given the one or more units; and assigning the search query to a subset of the one or more verticals based in part on the coverage adjusted log likelihood;

wherein the step of assigning the search query to a subset of the one or more verticals further comprises the steps of:

selecting a highest coverage adjusted log likelihood from coverage adjusted log likelihoods computed for the search query for each of the one or more verticals;

computing a set of differences between the highest coverage adjusted log likelihood and each coverage adjusted log likelihood computed for the search query for each of the one or more verticals; and assigning the search query to a subset of the one or more verticals further based at least in part on the set of differences;

wherein the method is performed by one or more computing devices.

2. The method of claim 1, wherein the step of segmenting the search query into units comprises segmenting the search query based on a main search index UNITS dictionary.

3. The method of claim 1, wherein the step of segmenting the search query into units comprises segmenting the search query based on a vertical's search index UNITS dictionary.

4. The method of claim 1, wherein the step of computing coverage adjusted log likelihood for the search query for each of the one or more verticals is based at least in part on unitization coverage, wherein the unitization coverage is a ratio of (a) the number of elements of the query which were unitized (b) the total number of elements in the query, wherein (a) and (b) are different numbers.

5. The method of claim 1, wherein the probability that the query belongs to a given vertical is based at least in part on a sum of probabilities of individual units of the query belonging to the given vertical.

6. The method of claim 1, wherein the step of assigning the search query to a subset of the one or more verticals further comprises:

plotting each difference in the set of differences and a corresponding coverage adjusted log likelihood as a set of points on a plane for a particular vertical of the one or more verticals;

defining an area on the plane; and assigning the search query represented by the set of points to the particular vertical if the point is within the area.

7. The method of claim 6, wherein the area is defined by a line.

8. The method of claim 1, wherein the coverage adjusted log likelihood for at least one of the verticals is between zero and one hundred percent probability of the search query belonging to that vertical.

9. A non-transitory machine-readable storage medium storing carrying one or more sequences of instructions which, when executed by one or more processors, causes the one or more processors to perform steps comprising:

segmenting a search query into one or more units;

wherein each unit of the one or more units is an element of a query;

for each of the one or more verticals, computing a coverage adjusted log likelihood for the search query;

wherein, for each particular vertical of the one or more verticals, the coverage adjusted log likelihood for the particular vertical is a conditional probability of the query appearing in a log of queries previously submitted within the particular vertical given the one or more units; and assigning the search query to a subset of the one or more verticals based in part on the coverage adjusted log likelihood, wherein the step of assigning the search query to a subset of the one or more verticals further comprises the steps of:

selecting a highest coverage adjusted log likelihood from coverage adjusted log likelihoods computed for the search query for each of the one or more verticals;

computing a set of differences between the highest coverage adjusted log likelihood and each coverage adjusted log likelihood computed for the search query for each of the one or more verticals; and assigning the search query to a subset of the one or more verticals further based at least in part on the set of differences.

10. The non-transitory machine-readable storage medium of claim 9, wherein the step of segmenting the search query into units comprises segmenting the search query based on a main search index UNITS dictionary.

11. The non-transitory machine-readable storage medium of claim 9, wherein the step of segmenting the search query into units comprises segmenting the search query based on a vertical's search index UNITS dictionary.

12. The non-transitory machine-readable storage medium of claim 9, wherein the step of computing coverage adjusted log likelihood for the search query for each of the one or more verticals is based at least in part on unitization coverage, wherein the unitization coverage is a ratio of (a) a number of elements of the query which were unitized to (b) a total number of elements in the query, wherein (a) and (b) are different numbers.

13. The non-transitory machine-readable storage medium of claim 9, wherein the probability that the query belongs to a given vertical is based at least in part on a sum of probabilities of individual units of the query belonging to the given vertical.

14. The non-transitory machine-readable storage medium of claim 9, wherein the step of assigning the search query to a subset of the one or more verticals further comprises:

plotting each difference in the set of differences and a corresponding coverage adjusted log likelihood as a set of points on a plane for a particular vertical of the one or more verticals;

defining an area on the plane; and assigning the search query represented by the set of points to the particular vertical if the point is within the area.

15. The non-transitory machine-readable storage medium of claim 14, wherein the area is defined by a line.

16. The non-transitory machine-readable storage medium of claim 9, wherein the coverage adjusted log likelihood for at least one of the verticals is between zero and one hundred percent probability of the search query belonging to that vertical.

* * * * *